United States Patent
Su et al.

(10) Patent No.: US 11,106,562 B2
(45) Date of Patent: Aug. 31, 2021

(54) SYSTEM AND METHOD FOR DETECTING ANOMALIES BASED ON FEATURE SIGNATURE OF TASK WORKFLOWS

(71) Applicant: VMware, Inc., Palo Alto, CA (US)

(72) Inventors: Hang Su, San Jose, CA (US); Zhe Yang, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/671,074

(22) Filed: Oct. 31, 2019

(65) Prior Publication Data
US 2021/0133076 A1  May 6, 2021

(51) Int. Cl.
*G06F 11/34* (2006.01)
*G06N 20/00* (2019.01)
*G06F 11/36* (2006.01)
*H04L 29/08* (2006.01)

(52) U.S. Cl.
CPC ...... *G06F 11/3466* (2013.01); *G06F 11/3428* (2013.01); *G06F 11/3616* (2013.01); *G06F 11/3692* (2013.01); *G06N 20/00* (2019.01); *H04L 67/36* (2013.01)

(58) Field of Classification Search
None
See application file for complete search history.

(56) References Cited

U.S. PATENT DOCUMENTS

| | | | | |
|---|---|---|---|---|
| 5,926,462 | A * | 7/1999 | Schenkel | H04L 41/12 370/248 |
| 8,489,765 | B2 * | 7/2013 | Vasseur | H04L 45/48 709/238 |
| 8,543,690 | B1 * | 9/2013 | Zeitoun | H04L 41/145 709/224 |
| 9,032,416 | B2 * | 5/2015 | Swart | G06F 9/5066 718/105 |
| 2004/0193705 | A1 * | 9/2004 | To | H04L 45/28 709/223 |
| 2012/0155329 | A1 * | 6/2012 | Shaffer | H04L 45/023 370/255 |
| 2015/0082432 | A1 * | 3/2015 | Eaton | G06F 9/5072 726/23 |
| 2016/0248661 | A1 * | 8/2016 | Dasgupta | H04L 41/5019 |

OTHER PUBLICATIONS

Battre et al., "Detecting Bottlenecks in Parallel DAG-based Data Flow Programs," IEEE, 2010, 10pg. (Year: 2010).*
Feng et al., "Near-Duplicate Detection Using GPU-based Simhash Scheme," IEEE, 2014, 6pg. (Year: 2014).*
(Continued)

*Primary Examiner* — Ryan D. Coyer
(74) *Attorney, Agent, or Firm* — Loza & Loza, LLP (57) ABSTRACT

A system and method for detecting anomalies in task workflows uses a directed acyclic graph constructed using metrics for a workflow of a task collected from software entities that perform operations to execute the task. A feature signature of the task workflow is generated using key values extracted from the directed acyclic graph, which is then used to compute a similarity value by comparing the feature signature with a reference feature signature for a baseline task workflow. The similarity value is then used to diagnose any performance issues in the workflow of the task executed by the software entities.

20 Claims, 7 Drawing Sheets

(56) References Cited

OTHER PUBLICATIONS

Ren et al., "Directed Adaptive Graphical Lasso for causality inference," Elsevier, 2015, 6pg. (Year: 2015).*

Charikar, M. "Similarity estimation techniques from rounding algorithms," In Proc. of Symp. on Theory of Comput. (STOC), 2002, 9 pgs.

Wikipedia, "Locality-sensitive hashing", https://en.wikipedia.org/wiki/Locality-sensitivehashing, retrieved Jun. 24, 2020, 9 pgs.

Vmware, "Vmware cloud on aws", https://cloud.vmware.com/vmc-aws, retrieved Jun. 24, 2020, 10 pgs.

Wikipedia, "Hamming distance", https://en.wikipedia.org/wiki/Hammingdistance, retrieved Jun. 24, 2020, 6 pgs.

Papadimitriou, P. et al. "Web graph similarity for anomaly detection," Journal of Internet Services and Applications, vol. 1, No. 1, 2010, pp. 19-30.

Zhao, Z. et al. "Spectral feature selection for supervised and unsupervised learning", in Proceedings of the 24th international conference on Machine learning. ACM, 2007, pp. 1151-1157.

Love, B. C. "Comparing supervised and unsupervised category learning," Psychonomic bulletin & review, vol. 9, No. 4, 2002, pp. 829-835.

Langkvist, M. et al. "A review of unsupervised feature learning and deep learning for time-series modeling," Pattern Recognition Letters, vol. 42, 2014, pp. 11-24.

Chapelle, O. et al. "Semi-supervised learning (chapelle,o. et al., eds.; 2006)[book reviews]," IEEE Transactions on Neural Networks, vol. 20, No. 3, 2009, pp. 542-542.

* cited by examiner

SYSTEM AND METHOD FOR DETECTING ANOMALIES BASED ON FEATURE SIGNATURE OF TASK WORKFLOWS

BACKGROUND

With the advent of distributed systems and microservices based architecture, online cloud services can be provided to end users to support cloud computing environments, such as software-defined data center (SDDC). The online cloud services may provide various product features via application programming interfaces (APIs) to execute tasks related to the cloud computing environments, such as adding a virtual private network in a cloud computing environment. These tasks need to be monitored to detect and diagnose performance degradation and task failures in a quick and effective way to provide high quality of service to the end users.

Currently, performance issues for such tasks may be monitored by setting up thresholds for performance metrics and track task status in a performance dashboard provided by a machine data analytics platform, such as Logz.io platform. However, using such a machine data analytics platform, it is not easy to configure proper thresholds. With tight thresholds, the performance dashboard generates a high volume of false alerts. With loose thresholds, the performance dashboard may ignore real performance issues. In addition, the performance dashboard only displays either "failed" or "succeeded" for each task status, which does not provide any information of root causes of task failures.

SUMMARY

A system and method for detecting anomalies in task workflows uses a directed acyclic graph constructed using metrics for a workflow of a task collected from software entities that perform operations to execute the task. A feature signature of the task workflow is generated using key values extracted from the directed acyclic graph, which is then used to compute a similarity value by comparing the feature signature with a reference feature signature for a baseline task workflow. The similarity value is then used to diagnose any performance issues in the workflow of the task executed by the software entities.

A computer-implemented method for detecting anomalies in task workflows in accordance with an embodiment of the invention comprises collecting metrics from software entities that perform operations to execute a task, constructing a directed acyclic graph using the collected metrics for a workflow of the task, extracting key values from the directed acyclic graph related to at least one of latency of edges and topology of vertexes in the directed acyclic graph, generating a feature signature for the task workflow using the key values, computing a similarity value by comparing the feature signature with a reference feature signature of a baseline task workflow, and using the similarity value to diagnose any performance issues in the workflow of the task executed by the software entities. In some embodiments, the steps of this method are performed when program instructions contained in a non-transitory computer-readable storage medium are executed by one or more processors.

A system in accordance with an embodiment of the invention comprises memory and at least one processor configured to collect metrics from software entities that perform operations to execute a task, construct a directed acyclic graph using the collected metrics for a workflow of the task, extract key values from the directed acyclic graph related to at least one of latency of edges and topology of vertexes in the directed acyclic graph, generate a feature signature for the task workflow using the key values, compute a similarity value by comparing the feature signature with a reference feature signature of a baseline task workflow, and use the similarity value to diagnose any performance issues in the workflow of the task executed by the software entities.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
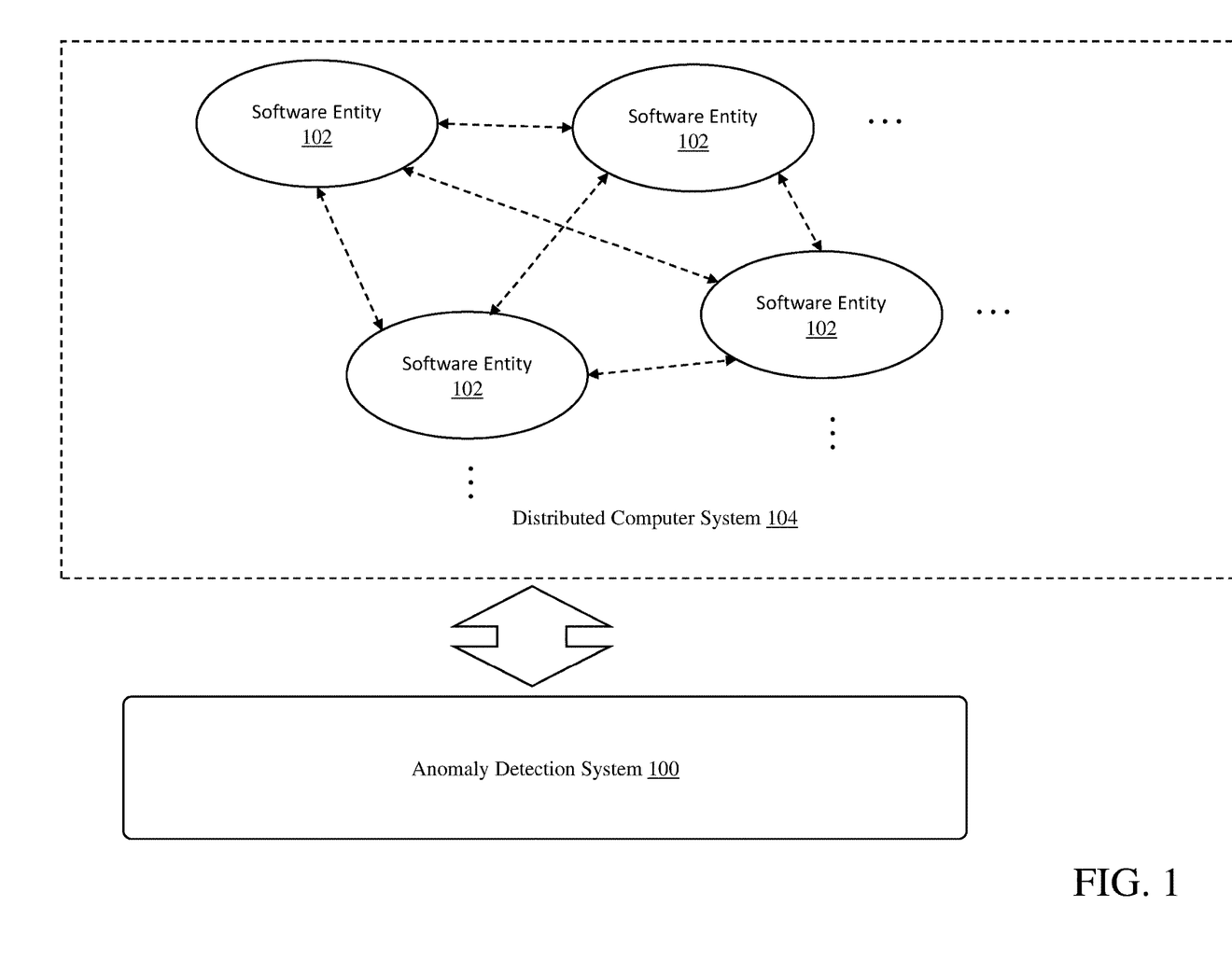
FIG. 1 is a block diagram of an anomaly detection system and software entities running in a distributed computer system in accordance with an embodiment of the invention.

FIG. 1 shows an anomaly detection system 100 for detecting task workflow anomalies due to latency and/or topology of software entities 102 (i.e., 102A, 102B, 102C, 102D . . . ) in a distributed computer system 104 that execute requested tasks in accordance with an embodiment of the invention. As used herein, software entities can be any microservices or any software components executing in a computer environment. As explained in more detail below, the anomaly detection system 100 uses task feature signature comparisons to determine performance similarities between executed tasks and reference tasks. The results of the comparisons provide information regarding latency and/or topology of the software entities that were involved in the executed tasks. Thus, the results of the anomaly detection system 100 will be useful for evaluating and analyzing task failures and task performance issues, which may then be used to troubleshoot these detected issues.

The distributed computer system 104 allows software-based tasks to be executed using one or more of the software entities 102 running in the distributed computer system. These software-based tasks can be any tasks that involve one or more operations or processes and/or one or more interactions with the software entities e components 106 running in the distributed computer system 104. As an example, software-based tasks executed in the distributed computer system 104 may be software-defined data center (SDDC) related tasks, such as adding a firewall rule, creating an SDDC in the distributed computer system 104 and adding a virtual private network (VPN) in an existing SDDC in the distributed computer system. The software entities 102 that execute the software-based tasks may be microservices that execute various operations in certain sequences to complete the tasks, which may be requested using API calls from end users. The software entities 102 are separate computer programs, which may include one or more processing routines to execute various operations to complete the requested tasks.

Different types of tasks may have different task workflows through a number of software entities. On any given task workflow, performance issues may arise due to latencies between software entities, task workflow topology changes and/or software entity failures. These performance issues will be demonstrated using an adding a VPN (ADD-VPN) task workflow in a Skyscraper service that serves as backend for VMware cloud (VMC) on Amazon Web Services (AWS), which is responsible for deploying, reconfiguring and managing VMware owned SDDCs ecosystem on AWS. The Skyscraper service may also provide other core services, such as billing, security, logging, health status, resource usage and portal. In the explanation below, only major microservices of the Skyscraper service will be discussed to demonstrate task performance issues, such as an SS server (backend server), a user interface (UI) portal, a MariaDB (database) and a RabbitMQ (message-broker software).

Figure 2A:
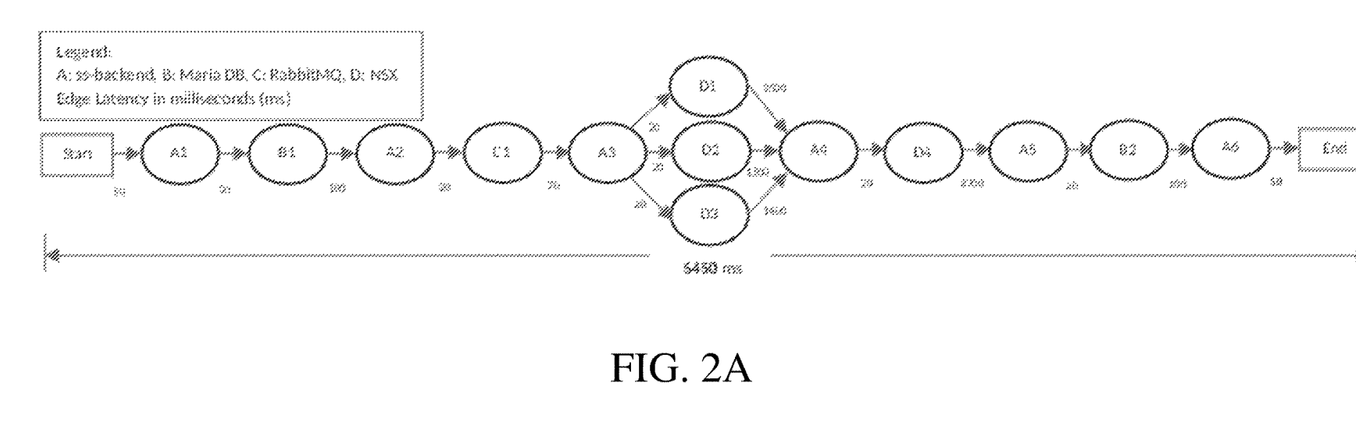
FIG. 2A is a directed acyclic graph of an expected ADD-VPN task workflow.

As shown in FIG. 2A, the ADD-VPN task workflow can be represented as directed acyclic and time-series graph G with latency labeled on edges. In this graph, vertexes represent microservices that are invoked for the task, even for the same microservice once it is invoked. Vertexes A1, A2 A3, A4, A5 and A6 represent the SS backend microservice that has been invoked six times. Vertexes B1 and B2 represent the MariaDB microservice that has been invoked two times. Vertex C1 represents the RabbitMQ microservice that has been invoked once. Vertexes D1, D2, D3 and D4 represent a VMware NSX™ microservice ("NSX microservice") that has been invoked four times. The latency on any edge from any vertex X to any vertex Y represents accumulate time, which includes queuing and processing time on the vertex X and transmission time for response from the vertex X to the vertex Y.

As seen in FIG. 2A, when an ADD-VPN request arrives at the SS server, the SS server first creates a corresponding task and sends the task to the MariaDB (vertex A1→vertex B1). The MariaDB marks the task to "Started" status and responds to the ss-server (vertex B1→vertex A2). Then, the SS server (vertex A2) sends the task to the RabbitMq. The working thread (vertex A3) picks up the task from the RabbitMq and sends three parallel READ requests to a VMware® NSX Manager™ module ("NSX") for obtaining related VPN info. At this point, three vertexes D1, D2 and D3 for the NSX microservice are generated since the vertexes represent three independent API calls to the NSX. When the working thread (vertex A4) receives responses of all three API invocations from the NSX, the SS server sends the adding VPN request to the NSX (vertex D4). Note that the vertex A4 cannot proceed until last response from the vertex D1 has been received. After the VPN has been successfully added on the NSX, the working thread (vertex A5) updates the task status to "Finished" on the MariaDB (vertex A5→vertex B2) and finally responds to the client (vertex A6→End). The end-to-end latency for the ADD-VPN task is 5450 ms. The latency and topology of the ADD-VPN task workflow shown in FIG. 2A are expected and can be regarded as baseline G for ADD-VPN task type.

Figure 2B:
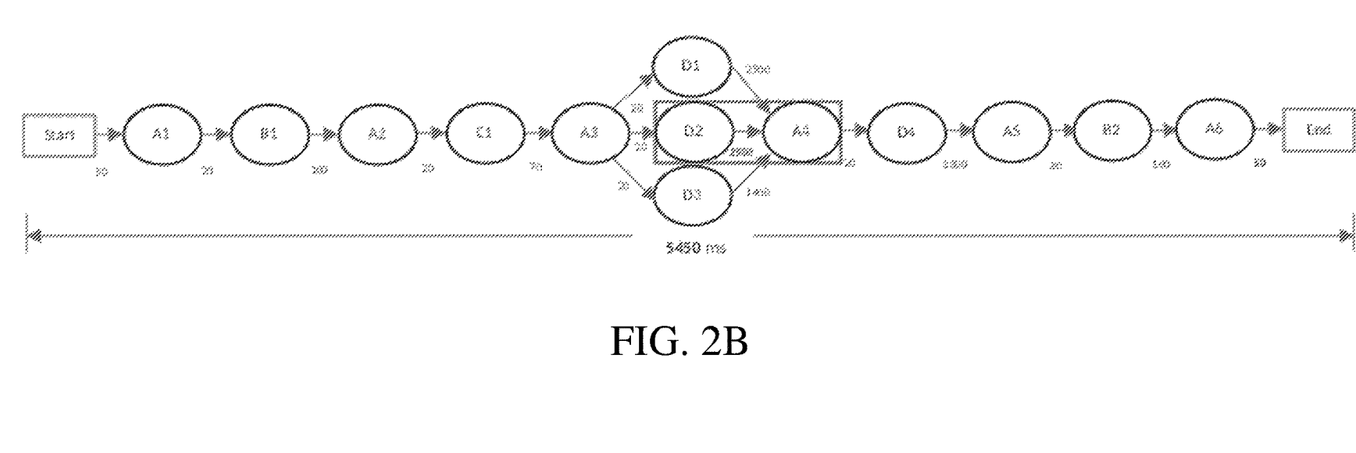
FIG. 2B is a directed acyclic graph of an ADD-VPN task workflow when there is an edge latency issue.

FIG. 2B illustrates an ADD-VPN task flow when there is an edge latency issue. As seen in FIG. 2B, the only difference compared with FIG. 2A is the latency on the edge D2→A4 increased from 1500 ms to 2500 ms (increased by 67%). However, the end-to-end latency does not change since the edge D2→A4 overlaps with the edge D1→A4. The abnormal behavior on the edge D2→A4 cannot be detected by only monitoring the end-to-end latency.

Figure 2C:
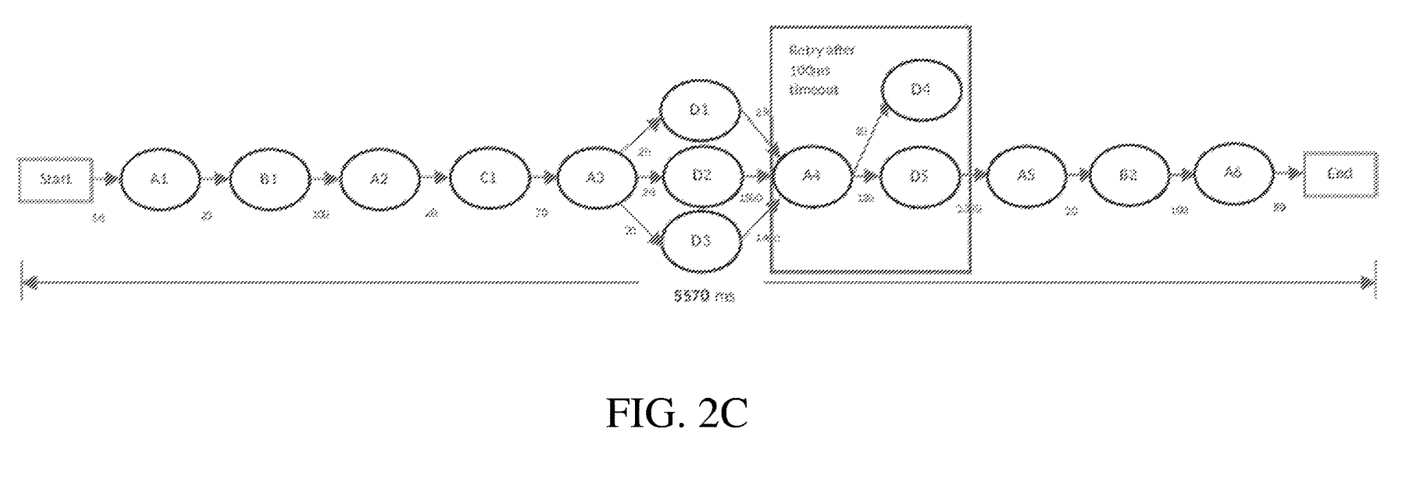
FIG. 2C is a directed acyclic graph of an ADD-VPN task workflow when there is a task topology change due to a retry.

FIG. 2C illustrates an ADD-VPN task flow when there is a task topology change due to a retry. In normal cases, a specific type of task, e.g., an ADD-VPN task as seen in FIG. 2A, has a static pattern of workflow (baseline) serviced by different microservices in mixed way of parallel and sequential sequence with timing-series order. However, unexpected behaviors may occur. For example, as illustrated in FIG. 2C, the NSX microservice (vertex D4) has temporary issues and does not respond to the request from the SS server microservice (vertex A4) and the NSX microservice sends another request (retry) after 100 ms timeout. The retry works, as illustrated by the edge A4→D5, and the task proceeds to next stage and successfully finishes. (Note that the latency of the edge A4→D5 is 120 ms since 100 ms retry timeout is counted). The end-to-end latency for the task workflow is 5570 ms, which is an increase of only 1.8% with its baseline of 5450 ms. This anomaly would be almost impossible to detect by tracking task status and end-to-end latency. Thus, this type of task workflow and other similar task workflows that do not follow their baseline workflow would be difficult to detect and diagnose using conventional methods.

Figure 2D:
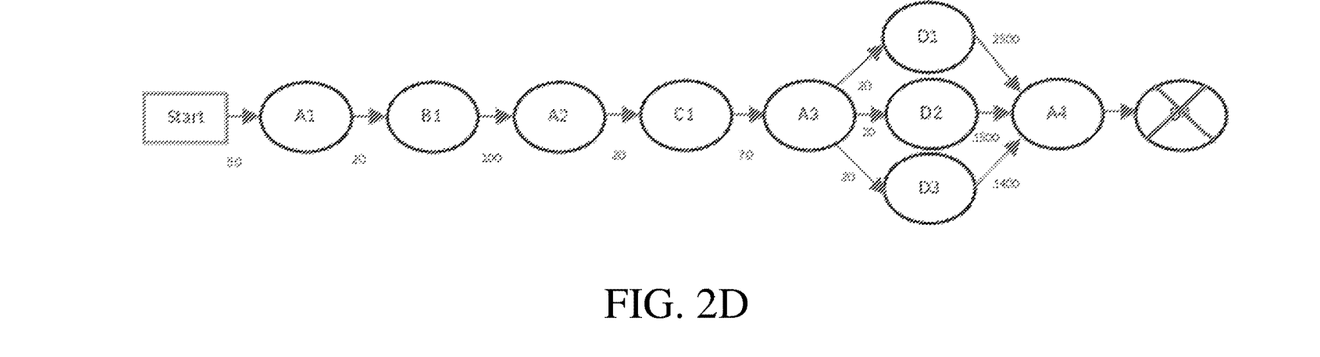
FIG. 2D is a directed acyclic graph of an ADD-VPN task workflow when there is a failure.

FIG. 2D illustrates an ADD-VPN task workflow when there is a failure. In a task workflow, any of the vertexes may fail to cause the task failure. For example, as shown in in FIG. 2D, the NSX microservice (vertex D4) has permanently failed, which caused the task failure. Conventionally, such a task failure would require review of a high volume of logs with domain knowledge, checking each step from the very beginning, to determine the root cause of the task failure. Thus, troubleshooting a task failure is a very time-consuming process, especially for more complex tasks.

The anomaly detection system 100 employs a threshold-free and microservice-aware anomaly detection method based on feature signatures of task workflows to detect various task workflow anomalies, such as those shown in FIGS. 2B-2D. As explained below in detail, the anomaly detection system 100 first constructs a directed acyclic graph (G') with latency information on edges between vertexes for diagnosed task instances using log information that is collected from the different microservices. The directed acyclic graph (G') is then transformed into a set of weighted features, which is used to generate a task feature signature using a hash function. The task feature signature is compared with the task feature signature of its baseline task workflow to measure the amount of similarity between the two signatures, which serves as an indicator for anomaly detection. This anomaly detection method does not require any thresholds, and is able to sensitively perceive latency and topology changes on task workflows so that different types of performance issues, including retries and failures, can be detected.

Each type of task has an expected workflow (baseline), which can be formulated by a corresponding directed acyclic graph and timeseries G=(V, E, L) with only one starting vertex s and only one end vertex f, where V, E ⊂ V×V, and W denotes the set of nodes (V), edges (E) and the edge latency (L), respectively. Each vertex $v_i$ has a tuple ($c_i$, $w_i$, $d_i$), in which indicates category (e.g., type of microservice), importance weight (how important we concern about this vertex in anomaly detect) and distance (number of hops) from starting vertex s, respectively. The edge e(i, j)∈E indicates there exists an edge from vertex $v_i$ to vertex $v_j$. Each edge e(i, j) has a latency l(i, j), which is the summation of latencies: 1) queueing time at vertex $v_i$; 2) processing time at vertex $v_i$; 3) network latency from vertex $v_i$ to vertex $v_j$.

In order to precisely describe topology and provide rich information on featuring of graph for anomaly detection, there are more denotations of graph, as set forth below. The incoming and outgoing neighbor vertexes of $v_i$ are represented by $v_i^{In}=\{v_i|e(j,i)\in E\}$ and $v_i^{Out}=\{v_j|e(i,j)\in E\}$. The number of total neighbors of vertex $v_i$ is $|v_i^{Out}|+|v_i^{In}|$. $f_i^{In}$ and $f_i^{Out}$ is number of different of pairs $(c_j, c_i)/(c_i, c_j)$, where $v_j \in v_i^{In}/v_j \in v_i^{Out}$ respectively.

The anomaly detection system 100 adopts a signature-based method for measuring similarity of two task workflows for the same type of task. The basic rule is "two workflows are similar if their signatures are similar." The anomaly detection system 100 uses a hashing scheme to measure the similarity of two task workflows. In an embodiment, the anomaly detection system 100 uses the SimHash hashing scheme, which is one of the popular locality sensitive hashing schemes that was originally used by Google for quickly estimating similarity of two web pages for duplication detections. In the anomaly detection system 100, SimHash is used to generate feature signatures of task workflows. The key feature of locality sensitive hashing is to generate similar outputs for given similar inputs, which is significantly different from cryptographic hash function, e.g., MD5 message-digest algorithm.

The similarity of two graph G and G' is estimated as γ(G, G') in the following equation.

$$\gamma(G, G') = 1 - \frac{\text{Hamming}(h, h')}{b}, \quad \text{(Eq. 1)}$$

where h and h' are the b-bit vectors corresponding to G and G', respectively, and the hamming distance Hamming(G, G') between two graphs is defined as the number of bit positions in h and h' for which the corresponding bits are different. Note that, γ(G, G') is [0, 1], where 0 indicates a perfect dissimilarity and 1 represents exact similarity. The fact of γ(G, G)=1 and γ(G', G')=1 is always guaranteed by properties of SimHash.

The existing work for SimHash focused on how to hash a document into a b-bit vector. However, it is not feasible for task anomaly detection since the input is a task workflow graph. Described below is how to hash a given input graph G and formulate hashing function $H_b(G)$=h for obtaining b-bit fingerprint vector h. Therefore, the anomaly detection system 100 can use γ(G, G') as a feature indicator for measuring the amount of similarity between a given graph G' and its baseline graph G by task type, as set forth in the following equation.

$$\gamma(G, G') = 1 - \frac{\text{Hamming}(H_b(G), H_b(G'))}{b} \quad \text{(Eq. 2)}$$

Originally, SimHash algorithm was used to hash a document d, which transforms d to a set of weighted features L={$(t_i, w_i)$}, where feature $t_i$ is a token of d and $w_i$ is its frequency in d. There is existing work that discussed how to transform a graph into a set of weighed features and use SimHash to obtain a signature of the graph. However, this work did not consider latency on edges and type of microservices associated with vertexes. The transformation from a graph to a b-bit vector is quite challenging since not only latency on edges and type of vertexes are considered, but also topology structure of the graph. To precisely and comprehensively hash graph for anomaly detection, similarity of feature signatures between G and G' in two dimensions is considered. The first dimension involves similarity of feature signatures between graphs G and G', denoted by $\gamma^{Lat}(G, G')$, only considering edge latencies, where reflects properties of edge latency in task workflow graph. If queueing/processing time increases/decreases on microservices, it can be detected by observing difference of this feature signature compared with its baseline task workflow. The second dimension involves similarity of feature signatures between graphs G and G', denoted by $\gamma^{Top}(G, G')$, only considering graph topology, which reflects properties in terms of number, neighbors, microservice types, incoming and outgoing edges of vertexes in task workflow graph. The retry behaviors between microservices and task failures both can result in topology change of task workflow compared with its baseline workflow, which potentially leads to a different feature signature of topology. Note that, topology change also may have an impact on latency feature signature, but not vice versa.

The anomaly detection system 100 uses a microservice-aware task feature signature in the above two dimensions. The anomaly detection system 100 considers latency of all existing edges by categorizing in pairs of microservice types (note: X and Y indicate microservice types) as feature token and normalized latency is according to weights as represented by $L^{Lat}=\{((X, Y), l'(X, Y)\}$, as set forth below in Eq. 3, where $\tilde{l}$ is the median value of set of $\{l(X, Y)\}$. The reason for using normalized values is to eliminate high variance among latencies and prevent a microservice with extremely high latency from dominating others. The target is to sense any small and/or abrupt change on edge latency. Based on $L^{Lat}$, SimHash is used to generate feature signature of latency $H_b^{Lat}$ and therefore obtain similarity $\gamma^{Lat}(G, G')$ in terms of latency, as set forth in Eq. 5.

$$l'(X, Y) = \begin{cases} \dfrac{\tilde{l} - l(X, Y)}{\tilde{l}}, & \text{if } \tilde{l} \geq l(X, Y) \\ \dfrac{l(X, Y) - \tilde{l}}{l(X, Y)}, & \text{otherwise} \end{cases} \quad \text{(Eq. 3)}$$

$$l(X, Y) = \sum l(i, j), \text{ where } c_i = X \text{ and } c_j = Y$$

$$H_b^{Lat}(G) = SimH_b(L^{Lat}) \quad \text{(Eq. 4)}$$

$$\gamma^{Lat}(G, G') = 1 - \frac{\text{Hamming}(H_b^{Lat}(G), H_b^{Lat}(G'))}{b}. \quad \text{(Eq. 5)}$$

For detecting topology change on task workflows, the anomaly detection system 100 considers the following aspects on topology feature by microservice type. The frequency of vertexes by microservice type $L^1=\{(X, f(X))\}$, as set forth in Eq. 6. The summation of number of vertex neighbors by microservice type $L^2=\{(X, p(X))\}$, as set forth in Eq. 7. The different microservice types of vertex neighbors by microservice type $L^3=\{(X, t(X))\}$, as set forth in Eq. 8. The average distance of vertexes by microservice type $L^4=\{(X, d(X))\}$, as set forth in Eq. 9.

$$f(X)=|\{v_i\}|, \text{ where } c_i=X \quad \text{(Eq. 6)}$$

$$p(X)=\Sigma|v_i^{Out}|+|v_i^{In}|, \text{ where } c_i=X \quad \text{(Eq. 7)}$$

$$t(X)=\Sigma f_i^{In}+f_i^{Out}, \text{ where } c_i=X \quad \text{(Eq. 8)}$$

$$d(X)=\Sigma d_i, \text{ where } c_i=X \quad \text{(Eq. 9)}$$

Based on $L^1$, $L^2$, $L^3$ and $L^4$, SimHash is used to generate feature signature of topology $H_b^{Top}$ and therefore obtain similarity $\gamma^{Top}(G, G')$ in terms of topology, as set forth in Eq. 11. Note that SimHbx generates a bx-bits binary vector for given input $L^x$ and "+" symbol in Eq. 10 represents vector concatenation to get a b-bits vector H(G), where b1+b2+b3+b4=b. The anomaly detection system 100 aims to avoid interleave among different aspects of topology feature for having more sensitive perception on any topology change, and therefore, vector concatenation is adopted instead of vector summation.

$$H_b^{Top}(G) = SimH_{b1}(L^1) + SimH_{b2}(L^2) + SimH_{b3}(L^3) + SimH_{b4}(L^4) \quad \text{(Eq. 10)}$$

$$\gamma^{Top}(G, G') = 1 - \frac{\text{Hamming}(H_b^{Top}(G), H_b^{Top}(G'))}{b} \quad \text{(Eq. 11)}$$

Figure 3:
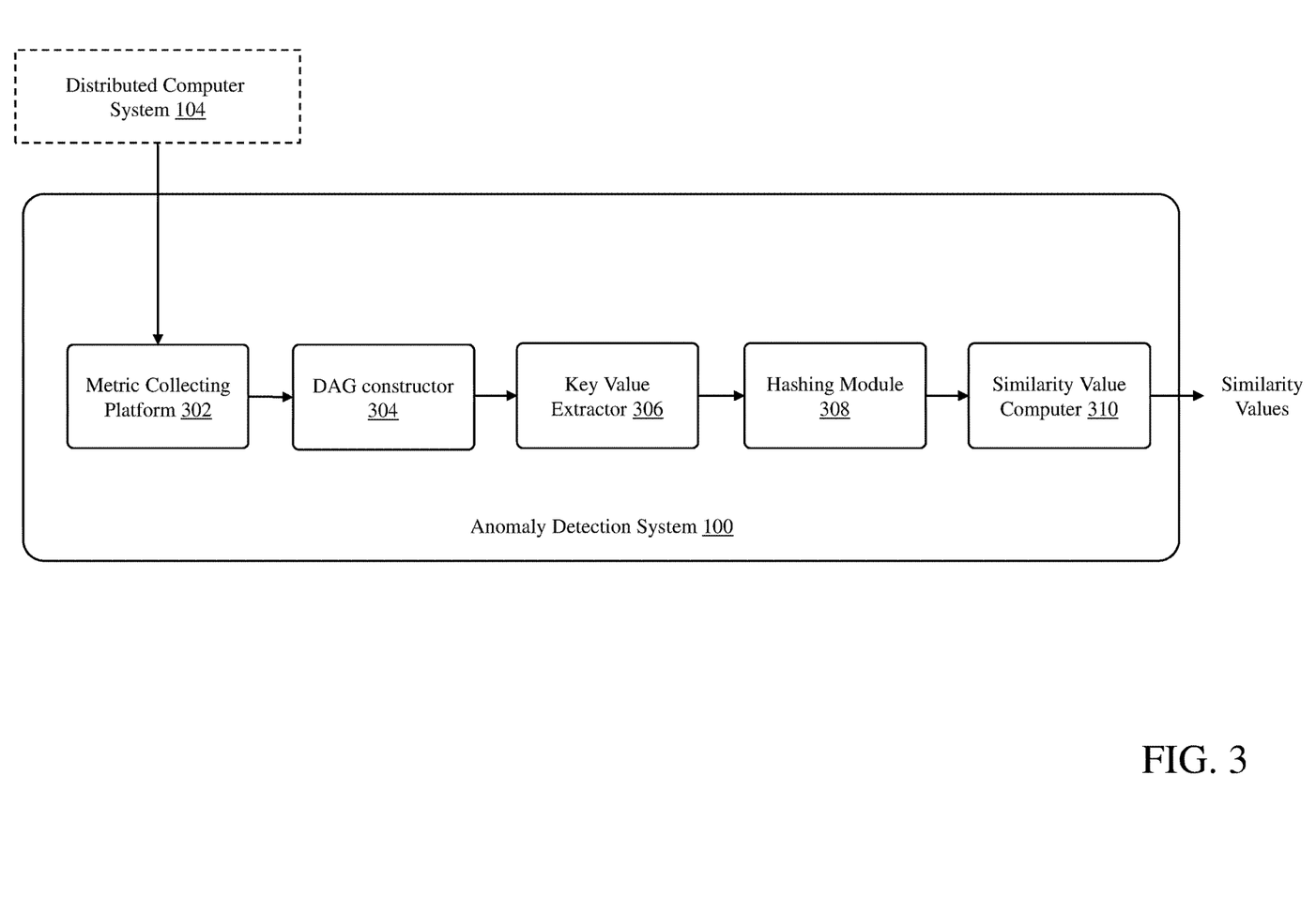
FIG. 3 is a block diagram of components of the anomaly detection system in accordance with an embodiment of the invention.

Turning now to FIG. 3, components of the anomaly detection system 100 in accordance with an embodiment of the invention are illustrated. As shown in FIG. 3, the anomaly detection system 100 includes a metric collecting platform 302, a DAG constructor 304, a key value extractor 306, a hashing module 308 and a similarity value computer 310. These components of the anomaly detection system 100 may be implemented as software running on one or more computer systems, which may be part of the distributed computer system 104.

The metric collecting platform 302 of the anomaly detection system 100 operates to collect various metrics from the software entities 102 running in the distributed computer system 104 that are performing operations to execute tasks. These metrics, which may be in the form of logs, may include task identification, type of task operation performed at each software entities 102 and time stamps that indicate queueing time and processing time at each microservice. In an embodiment, the software entities 102 may publish the metrics to the metric collecting platform 302 to be collected. In other embodiments, the metric collecting platform 302 may request and receive the metrics from each of the software entities 102.

The DAG constructor 304 of the anomaly detection system 100 operates to construct a directed acyclic graph (DAG) for a workflow of a task using the collected metrics for the task. The constructed DAG includes vertexes that represent the software entities 102 that perform operations to execute the task and edges that connect the vertexes, such as the DAGs shown in FIGS. 2A-2D. In an embodiment, the DAG also includes latency information for each of the edges in the DAG. The latency information for an edge from a first vertex to a second vertex may be an accumulated latency that includes queueing time at the first vertex, processing time at the first vertex and network latency from the first vertex to the second vertex. The DAG may be constructed with or without any graphics.

The key value extractor 306 of the anomaly detection system 100 operates to extract relevant key values or features from the constructed DAG. The key values may be predefined values related to the latency of the task workflow and the topology of the vertexes in the DAG. In an embodiment, the key values related to the latency of the task workflow include latency of edges based on microservice types and normalized latency of the edges. The key values related to the topology of the vertexes include frequency of vertexes based on software entity type (e.g., microservice type), summation of the number of vertex neighbors based on software entity type, the number of different types of vertex neighbors based on software entity type and the average distance of vertexes based on microservice type. These different values can be considered to be features of the topology of vertexes in a DAG.

The hashing module 308 of the anomaly detection system 100 operates to generate a latency feature signature and a topology feature signature for a task workflow using a hashing scheme. In an embodiment, a SimHash hashing scheme is used to take the key values related the latency of the task workflow to generate a latency feature signature using Eq. 4 and take the key values related to the topology of the vertexes to generate a topology feature signature using Eq. 10.

The similarity value computer 310 of the anomaly detection system 100 operates to compare the latency and topology feature signatures of the task workflow to corresponding reference latency and topology feature signatures of the baseline workflow for the same task to compute a latency similarity value and a topology similarity value, which provides a two-dimensional comparison of the actual executed task workflow with a baseline task workflow. In an embodiment, the similarity value computer 310 uses Eq. 5 to compute a latency similarity value and uses Eq. 11 to compute a topology similarity value. Since these similarity values provide information on how much the actual task workflow is different from the baseline task workflow, task workflow anomalies can be detected using the similarity values to diagnose any performance issues in the workflow of tasks executed by the software entities 102, which may involve an automated analysis using an algorithm and/or a manual analysis.

Figure 4:
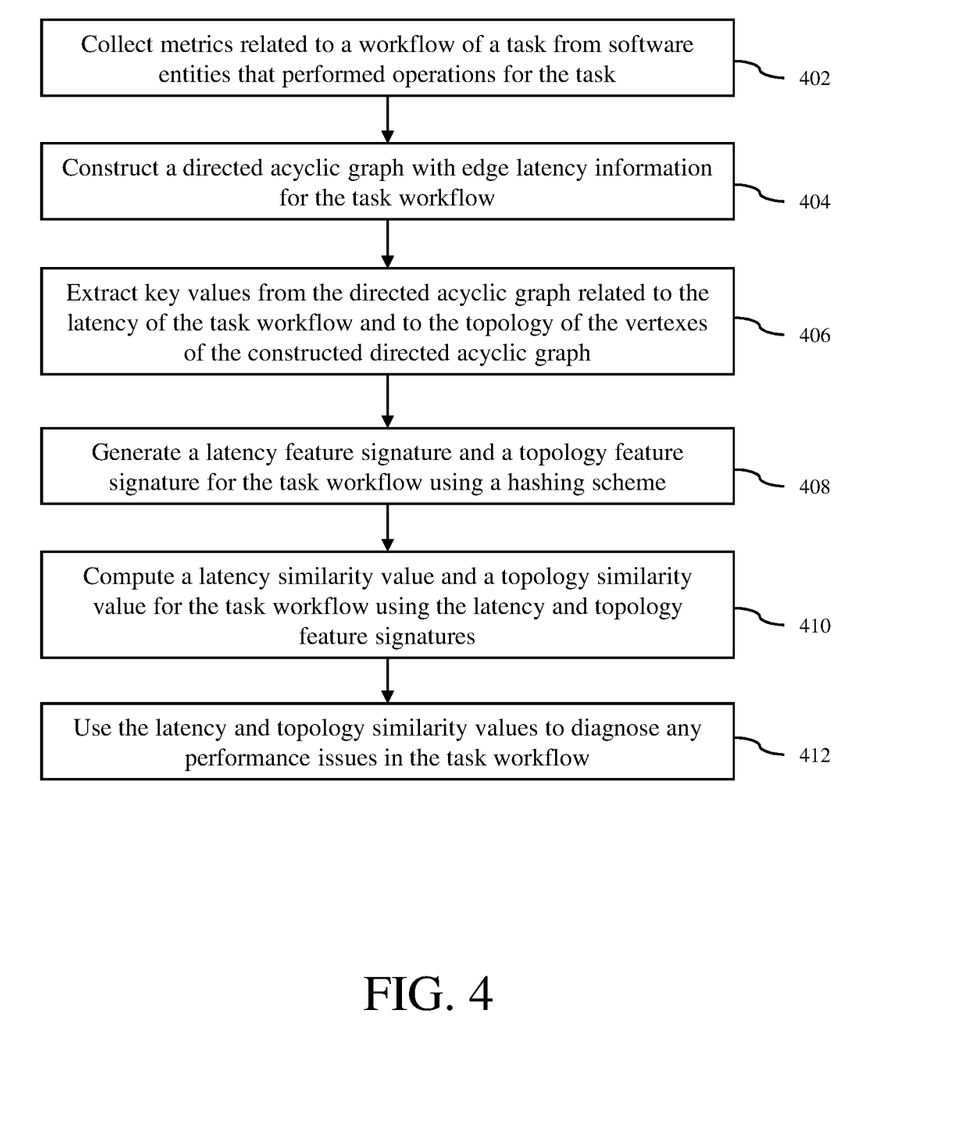
FIG. 4 is a flow diagram of the operation of the anomaly detection system in accordance with an embodiment of the invention.

The operation of the anomaly detection system 100 in accordance with an embodiment of the invention is now described with reference to a flow diagram of FIG. 4. At block 402, metrics related to a workflow of a task are collected by the metric collecting platform 302 from the software entities 102 that performed operations of the task.

Next, at block 404, a directed acrylic graph (DAG) with edge latency information for the task workflow is constructed by the DAG constructor 304 using the collected metrics for the task. The constructed DAG may resemble the DAGs shown in FIGS. 2A-2D.

Next, at block 406, key values related to the latency of the task workflow and to the topology of the vertexes of the constructed DAG are extracted from the constructed DAG by the key value extractor 306.

Next, at block 408, a latency feature signature and a topology feature signature for the task workflow are generated by the hashing module 308 using a hashing scheme, e.g., a SimHash hashing scheme.

Next, at block 410, a latency similarity value and a topology similarity value for the task workflow are computed by the similarly value computer 310 using the latency feature signature and the topology feature signature.

Next, at block 412, the latency and topology similarity values are used to diagnose any performance issues in the task workflow.

In an embodiment, the computed latency and topology similarity values can be used to figure out root causes of anomalies. For example, the different scenarios depicted in FIGS. 2B, 2C and 2D have their own similar values in two dimensions. For the scenario depicted in FIG. 2B, its similar value on topology is 1, but its similar value on edge latency is x (e.g., 0.8). Then, for given (1,x), one can quickly figure out that the given workflow has no topology change, but its edge latency differs from its baseline. Furthermore, for given two workflows from same type of task and their corresponding similarities values (y, x) and (y', x'), where y is close to y' and x is close to x', two workflows have high chance of having the same root cause of performance issue. Therefore, if one knows sample (y,x) and its root cause, one can predict the root cause of (y', x') in this case. Such root cause can be determination manually or can be determined using an algorithm executed by the anomaly detection system 100.

Figure 5:
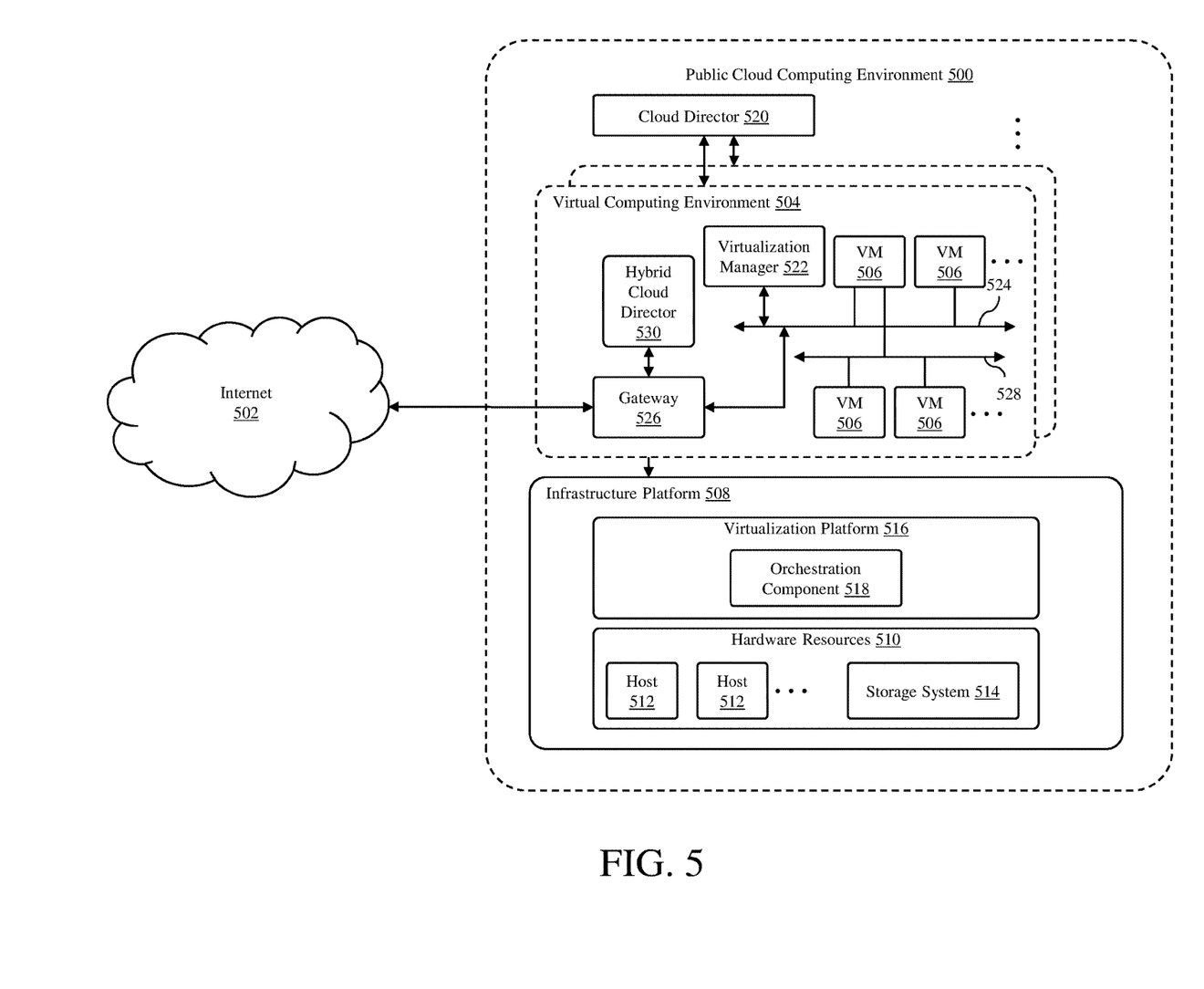
FIG. 5 is a block diagram of a public cloud computing environment in which the software entities and the anomaly detection system can be implemented in accordance with an embodiment of the invention.

Turning now to FIG. 5, a block diagram of a public cloud computing environment 500 that can be used to implement the software entities 102, the software components 106 and the anomaly detection system 100 in accordance with an embodiment of the invention is shown. The public cloud computing environment 500 may be operated by a cloud computing service provider and exposed as a service available to account holders, such as enterprises, which can be access via the Internet 502.

The public cloud computing environment 500 is configured to dynamically provide an enterprise (or users of an enterprise) with physical resources to execute applications. These resources may be provided using one or more virtual computing environments 504 in which virtual machines (VMs) 506 are running to execute the applications. The public cloud computing environment 500 includes an infrastructure platform 508 upon which the virtual computing environments can be executed. In the particular embodiment of FIG. 5, the infrastructure platform 508 includes hardware resources 510 having computing resources (e.g., host computers 512), storage resources (e.g., one or more storage systems 514, such as a storage area network (SAN)), and networking resources (not illustrated), and a virtualization platform 516, which is programmed and/or configured to provide the virtual computing environments 504 that support the virtual machines 506 running in the host computers 512. The virtualization platform 516 may be implemented using one or more software programs that reside and execute in one or more computer systems, such as the host computers 512, or in one or more virtual machines 506 running on the host computers.

In one embodiment, the virtualization platform 516 includes an orchestration component 518 that provides infrastructure resources to the virtual computing environments 504 responsive to provisioning requests. The orchestration component may instantiate virtual machines according to a requested template that defines one or more virtual machines having specified virtual computing resources (e.g., compute, networking and storage resources). Further, the orchestration component 518 may monitor the infrastructure resource consumption levels and requirements of the virtual computing environments 504 and provide additional infrastructure resources to the virtual computing environments as needed or desired. In one example, the virtualization platform 516 may be implemented by running on the hosts 512 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 500.

In one embodiment, the public cloud computing environment 500 may include a cloud director 520 that manages allocation of virtual computing resources to an enterprise. The cloud director may be accessible to users via a REST API or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 518 to instantiate the virtual machines (e.g., the virtual machines 506) as needed. One example of the cloud director is the VMware vCloud Director® product from VMware, Inc. The public cloud computing environment 500 may be VMware cloud (VMC) on Amazon Web Services (AWS).

In one embodiment, at least some of the virtual computing environments 504 may be configured as virtual data centers. Each virtual computing environment includes one or more virtual computing instances, such as the virtual machines 506, and one or more virtualization managers 522. One example of the virtualization manager 522 is the VMware vCenter Server® product made available from VMware, Inc. Each virtual computing environment may further include one or more virtual networks 524 used to communicate between the virtual machines 506 running in that environment and managed by at least one networking gateway device 526, as well as one or more isolated internal networks 528 not connected to the gateway device 526. The gateway device 526, which may be a virtual appliance, is configured to provide the virtual machines 506 and other components in the virtual computing environment 504 with connectivity to external devices.

In one embodiment, each virtual computing environments 504 includes a hybrid cloud director 530 configured to communicate with a corresponding hybrid cloud manager in a private cloud computing environment (not shown) to enable a common virtualized computing platform between the private and public cloud computing environments. The hybrid cloud director may communicate with the hybrid cloud manager in the private cloud computing environment using Internet-based traffic via a VPN tunnel established through the gateway. As an example, the hybrid cloud director 530 may be a component of the HCX-Cloud product, which is provided by VMware, Inc.

Figure 6:
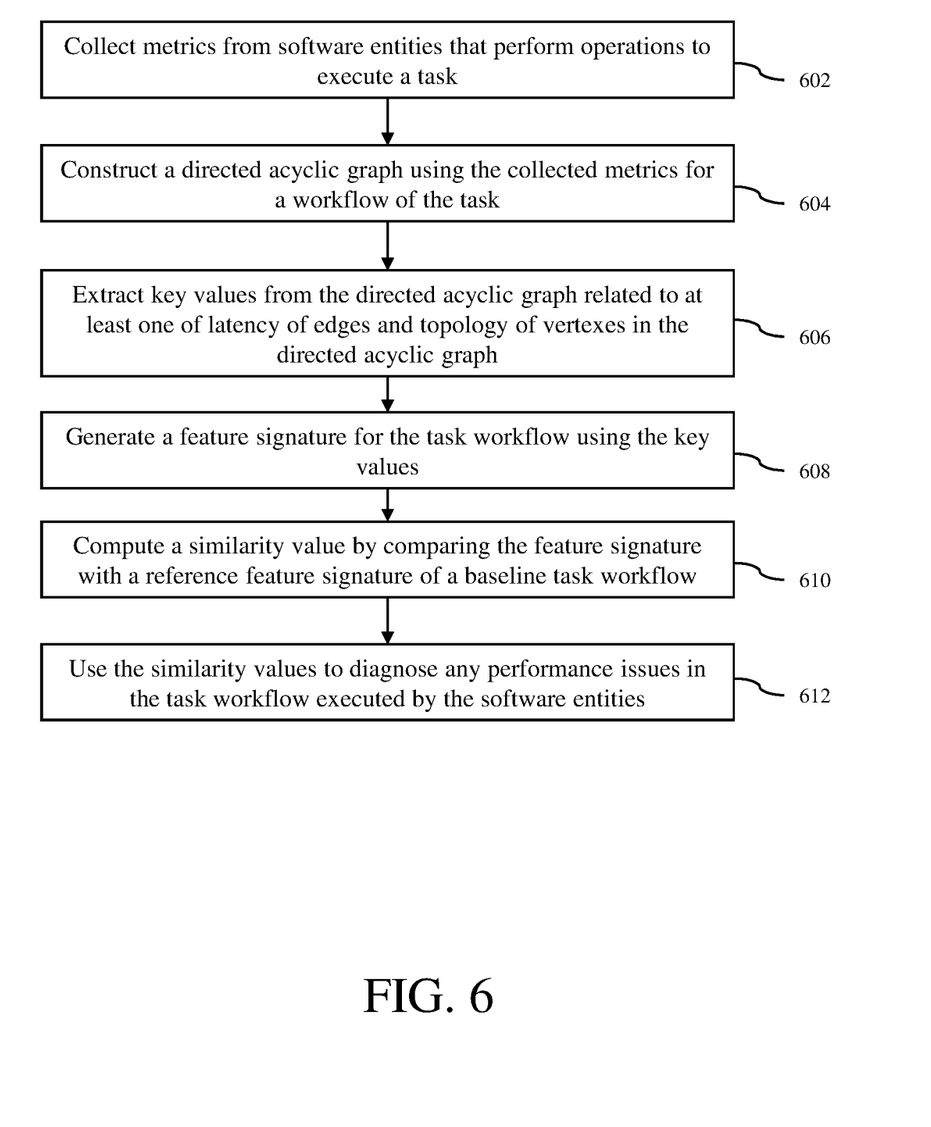
FIG. 6 is a flow diagram of a computer-implemented method for detecting anomalies in task workflows in accordance with an embodiment of the invention.

A computer-implemented method for detecting anomalies in task workflows in accordance with an embodiment of the invention is described with reference to a flow diagram of FIG. 6. At block 602, metrics from software entities, which may be microservices or software components, that perform operations to execute a task are collected. At block 604, a directed acyclic graph is constructed using the collected metrics for a workflow of the task. At block 606, key values are extracted from the directed acyclic graph related to at least one of latency of edges and topology of vertexes in the directed acyclic graph. At block 608, a feature signature for the task workflow is generated using the key values. At block 610, a similarity value is computed by comparing the feature signature with a reference feature signature of a baseline task workflow. At block 610, the similarity value is used to diagnose performance issues in the workflow of the task executed by the software entities.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for detecting anomalies in task workflows, the method comprising:
    collecting metrics from software entities that perform operations to execute a task;
    constructing a directed acyclic graph using the collected metrics for a workflow of the task;
    extracting key values from the directed acyclic graph related to at least one of latency of edges and topology of vertexes in the directed acyclic graph;
    generating a feature signature for the task workflow using the key values;
    computing a similarity value by comparing the feature signature with a reference feature signature of a baseline task workflow; and
    using the similarity value to diagnose any performance issues in the workflow of the task executed by the software entities,
    wherein generating the feature signature includes generating a topology feature signature using the key values related to the topology of vertexes and wherein computing the similarity value includes computing a topology similarity value by comparing the topology feature signature with a reference topology feature signature of the baseline task workflow.

2. The method of claim 1, wherein generating the feature signature includes generating a latency feature signature using the key values related to the latency of edges and wherein computing the similarity value includes computing a latency similarity value by comparing the latency feature signature with a reference latency feature signature of the baseline task workflow.

3. The method of claim 1, wherein generating the feature signature includes generating a latency feature signature using the key values related to the latency of edges and the topology feature signature using the key values related to the topology of vertexes and wherein computing the similarity value includes computing a latency similarity value by comparing the latency feature signature with a reference latency feature signature of the baseline task workflow and computing the topology similarity value by comparing the topology feature signature with the reference topology feature signature of the baseline task workflow.

4. The method of claim 1, wherein constructing the directed acyclic graph includes constructing the directed acyclic graph with latency information of edges of the directed acyclic graph.

5. The method of claim 4, wherein the latency information for each edge from a first vertex to a second vertex of the directed acyclic graph includes queueing time at the first vertex, processing time at the first vertex and network latency from the first vertex to the second vertex.

6. The method of claim 1, wherein generating the feature signature using the key values includes using a hashing scheme on the key values to produce the feature signature.

7. The method of claim 1, wherein the hashing scheme is a SimHash hashing scheme.

8. A non-transitory computer-readable storage medium containing program instructions for method for detecting anomalies in task workflows, wherein execution of the program instructions by one or more processors of a computer causes the one or more processors to perform steps comprising:
collecting metrics from software entities that perform operations to execute a task;
constructing a directed acyclic graph using the collected metrics for a workflow of the task;
extracting key values from the directed acyclic graph related to at least one of latency of edges and topology of vertexes in the directed acyclic graph;
generating a feature signature for the task workflow using the key values;
computing a similarity value by comparing the feature signature with a reference feature signature of a baseline task workflow; and
using the similarity value to any diagnose performance issues in the workflow of the task executed by the software entities,
wherein generating the feature signature includes generating a topology feature signature using the key values related to the topology of vertexes and wherein computing the similarity value includes computing a topology similarity value by comparing the topology feature signature with a reference topology feature signature of the baseline task workflow.

9. The computer-readable storage medium of claim 8, wherein generating the feature signature includes generating a latency feature signature using the key values related to the latency of edges and wherein computing the similarity value includes computing a latency similarity value by comparing the latency feature signature with a reference latency feature signature of the baseline task workflow.

10. The computer-readable storage medium of claim 8, wherein generating the feature signature includes generating a latency feature signature using the key values related to the latency of edges and the topology feature signature using the key values related to the topology of vertexes and wherein computing the similarity value includes computing a latency similarity value by comparing the latency feature signature with a reference latency feature signature of the baseline task workflow and computing the topology similarity value by comparing the topology feature signature with the reference topology feature signature of the baseline task workflow.

11. The computer-readable storage medium of claim 8, wherein constructing the directed acyclic graph includes constructing the directed acyclic graph with latency information of edges of the directed acyclic graph.

12. The computer-readable storage medium of claim 11, wherein the latency information for each edge from a first vertex to a second vertex of the directed acyclic graph includes queueing time at the first vertex, processing time at the first vertex and network latency from the first vertex to the second vertex.

13. The computer-readable storage medium of claim 8, wherein generating the feature signature using the key values includes using a hashing scheme on the key values to produce the feature signature.

14. The computer-readable storage medium of claim 8, wherein the hashing scheme is a SimHash hashing scheme.

15. A system comprising:
memory; and
at least one processor configured to:
collect metrics from software entities that perform operations to execute a task;
construct a directed acyclic graph using the collected metrics for a workflow of the task;
extract key values from the directed acyclic graph related to at least one of latency of edges and topology of vertexes in the directed acyclic graph;
generate a feature signature for the task workflow using the key values;
compute a similarity value by comparing the feature signature with a reference feature signature of a baseline task workflow; and
use the similarity value to diagnose any performance issues in the workflow of the task executed by the software entities,
wherein the at least one processor is configured to generate a topology feature signature using the key values related to the topology of vertexes and compute a topology similarity value by comparing the topology feature signature with a reference topology feature signature of the baseline task workflow.

16. The system of claim 15, wherein the at least one processor is configured to generate a latency feature signature using the key values related to the latency of edges and compute a latency similarity value by comparing the latency feature signature with a reference latency feature signature of the baseline task workflow.

17. The system of claim 15, wherein the at least one processor is configured to use a SimHash hashing scheme on the key values to produce the feature signature.

18. The method of claim 1, wherein the key values that are extracted from the directed acyclic graph includes at least one of frequency of vertexes based on software entity type, summation of the number of vertex neighbors based on software entity type, the number of different types of vertex neighbors based on software entity type and the average distance of vertexes based on software entity type.

19. The computer-readable storage medium of claim 8, wherein the key values that are extracted from the directed acyclic graph includes at least one of frequency of vertexes based on software entity type, summation of the number of vertex neighbors based on software entity type, the number of different types of vertex neighbors based on software entity type and the average distance of vertexes based on software entity type.

20. The system of claim 15, wherein the key values that are extracted from the directed acyclic graph includes at least one of frequency of vertexes based on software entity type, summation of the number of vertex neighbors based on software entity type, the number of different types of vertex neighbors based on software entity type and the average distance of vertexes based on software entity type.

* * * * *